United States Patent
Ha et al.

(10) Patent No.: US 7,999,789 B2
(45) Date of Patent: Aug. 16, 2011

(54) ELECTRICAL DEVICE WITH A SELECTED ORIENTATION FOR OPERATION

(75) Inventors: Wai-Leung Ha, Pokfulam (HK); Kairy Kai Lei, Shen Zhen (CN)

(73) Assignee: Computime, Ltd., Hong Kong (HK)

( * ) Notice: Subject to any disclaimer, the term of this patent is extended or adjusted under 35 U.S.C. 154(b) by 1121 days.

(21) Appl. No.: 11/686,006

(22) Filed: Mar. 14, 2007

(65) Prior Publication Data
US 2008/0228432 A1 Sep. 18, 2008

(51) Int. Cl.
*G09G 5/00* (2006.01)
*G06F 3/041* (2006.01)
*G01P 15/135* (2006.01)

(52) U.S. Cl. .... 345/156; 345/173; 345/55; 200/61.45 R; 248/919; 248/923; 361/679.26; 361/679.55; 361/679.56

(58) Field of Classification Search .......... 345/156–184; 200/61.45 R, 61.47; 248/919, 923; 361/679.26, 361/679.55, 679.56
See application file for complete search history.

(56) References Cited

U.S. PATENT DOCUMENTS

| | | | | |
|---|---|---|---|---|
| 5,373,125 A * | 12/1994 | Ford et al. | ................... | 200/61.52 |
| 5,737,125 A * | 4/1998 | Ohashi | ........................... | 359/565 |
| 5,936,619 A * | 8/1999 | Nagasaki et al. | .............. | 345/205 |
| 5,955,713 A * | 9/1999 | Titus et al. | .................. | 200/61.52 |
| 5,973,664 A * | 10/1999 | Badger | ......................... | 345/659 |
| 6,411,502 B1 * | 6/2002 | Burrell | ...................... | 361/679.3 |
| 6,982,728 B1 * | 1/2006 | Nicolas et al. | ................. | 345/649 |
| 7,115,824 B2 * | 10/2006 | Lo | .............................. | 200/61.52 |
| 7,372,452 B2 * | 5/2008 | Park | ............................... | 345/158 |
| 7,406,666 B2 * | 7/2008 | Davis et al. | ................... | 715/863 |
| 7,570,273 B1 * | 8/2009 | de Waal | ........................ | 345/649 |
| 2003/0122781 A1 * | 7/2003 | Koo | ............................... | 345/158 |
| 2005/0104848 A1 * | 5/2005 | Yamaguchi et al. | .......... | 345/156 |
| 2005/0110768 A1 * | 5/2005 | Marriott et al. | ............... | 345/173 |
| 2006/0033760 A1 * | 2/2006 | Koh | ............................... | 345/649 |
| 2007/0295540 A1 * | 12/2007 | Nurmi | ........................ | 178/18.01 |

FOREIGN PATENT DOCUMENTS

| | | |
|---|---|---|
| CN | 1296215 A | 5/2001 |
| CN | 1398367 A | 2/2003 |
| CN | 1405814 A | 3/2003 |
| CN | 1694059 A | 11/2005 |
| CN | 1932724 A | 3/2007 |
| CN | 101131608 A | 2/2008 |

OTHER PUBLICATIONS

International Search Report for PCT/CN2008/000507, dated Jun. 12, 2008, pp. 1-4.

* cited by examiner

*Primary Examiner* — Lun-Yi Lao
*Assistant Examiner* — Sosina Abebe
(74) *Attorney, Agent, or Firm* — Banner & Witcoff, Ltd.

(57) ABSTRACT

The present invention provides methods and apparatuses for configuring an electrical device to a selected orientation. Direction information that is indicative of the orientation of the electrical device is provided by a directional detection switch. A processor selects a selected orientation from a plurality of permitted orientations by processing the direction information and instructs a display unit to operate in the selected orientation. Different adjacent contacts of a directional detection switch are activated corresponding to different orientation of the electrical device. A conductive ball may be positioned by gravity and consequently conducts an electrical current between two corresponding adjacent contacts based on the orientation of the electrical device. A display unit of an electrical device may include an output component or an input component that is configured based on the orientation of the electrical device.

26 Claims, 9 Drawing Sheets

ELECTRICAL DEVICE WITH A SELECTED ORIENTATION FOR OPERATION

FIELD OF THE INVENTION

The present invention relates to an electrical device, e.g., a control device, to automatically configure operation to a desired configuration.

BACKGROUND OF THE INVENTION

A control device, e.g., digital thermostat, typically operates with a specific orientation in order to display output information and to receive input information from a user. However, physical constraints or aesthetic considerations may restrict the installation of the control device, in which the control device can only be installed in an unsupported orientation. Consequently, the user may be restricted when viewing the display and inputting information to the control device.

Thus, there is a real market need for supporting different orientations when mounting a control device.

SUMMARY OF THE INVENTION

The present invention provides methods and apparatuses for configuring an electrical device to a selected orientation.

With an aspect of the invention, direction information that is indicative of the orientation of the electrical device is provided by a directional detection switch. A processor selects a selected orientation from a plurality of permitted orientations by processing the direction information and instructs a display unit to operate in the selected orientation.

With another aspect of the invention, different adjacent contacts of a directional detection switch are activated corresponding to different orientation of an electrical device. Consequently, the directional detection switch is able to discern an up direction, a down direction, a right direction, and a left direction.

With another aspect of the invention, a directional detection switch has a plurality of electrical contacts. A conductive ball is positioned by gravity and consequently conducts an electrical current between two corresponding adjacent contacts based on an orientation of the electrical device.

With another aspect of the invention, a display unit of an electrical device includes an output component. The output component is configured based on the orientation of the electrical device.

With another aspect of the invention, a display unit of an electrical device includes an input component. The input component is configured based on the orientation of the electrical device.

With another aspect of the invention, the selected oriented may be changed based on modified direction information.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION OF INVENTION

Figure 1:
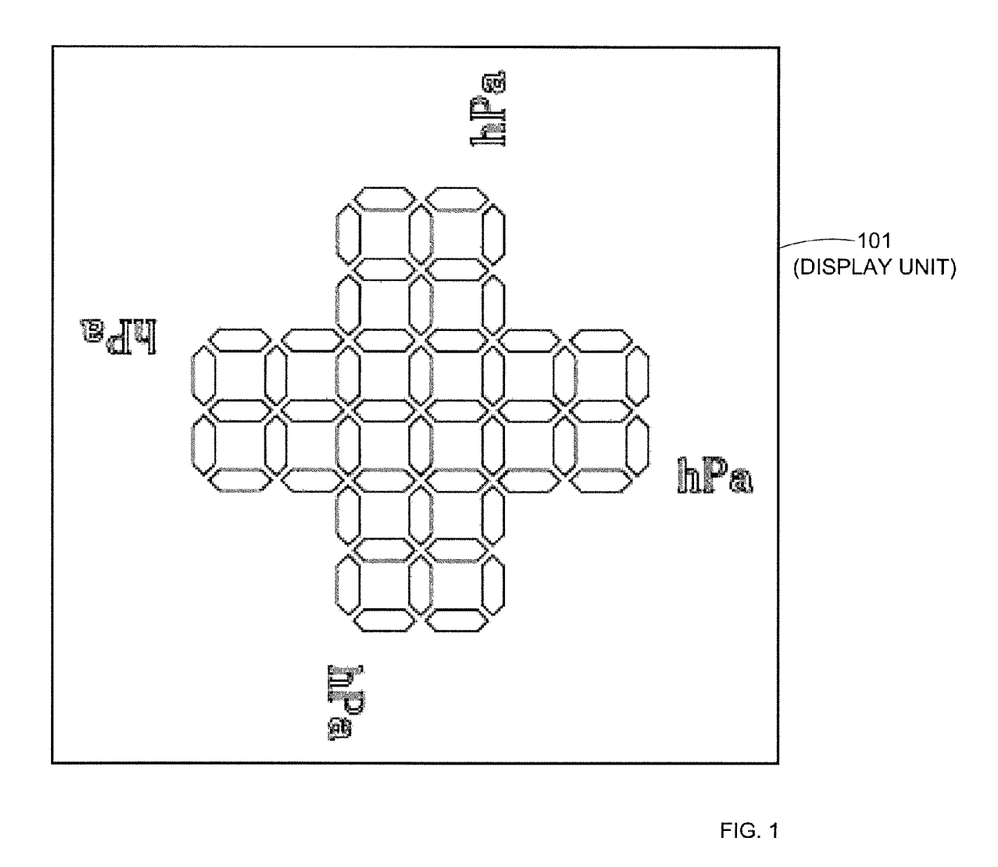
FIG. 1 shows a display unit in accordance with an embodiment of the invention.

FIG. 1 shows display unit 101 in accordance with an embodiment of the invention. FIG. 1 illustrates the display background of display unit 101. Display unit 101 can be configured to operate in different orientations, including an up direction, a down direction, a right direction, and a left direction.

Figure 1A:
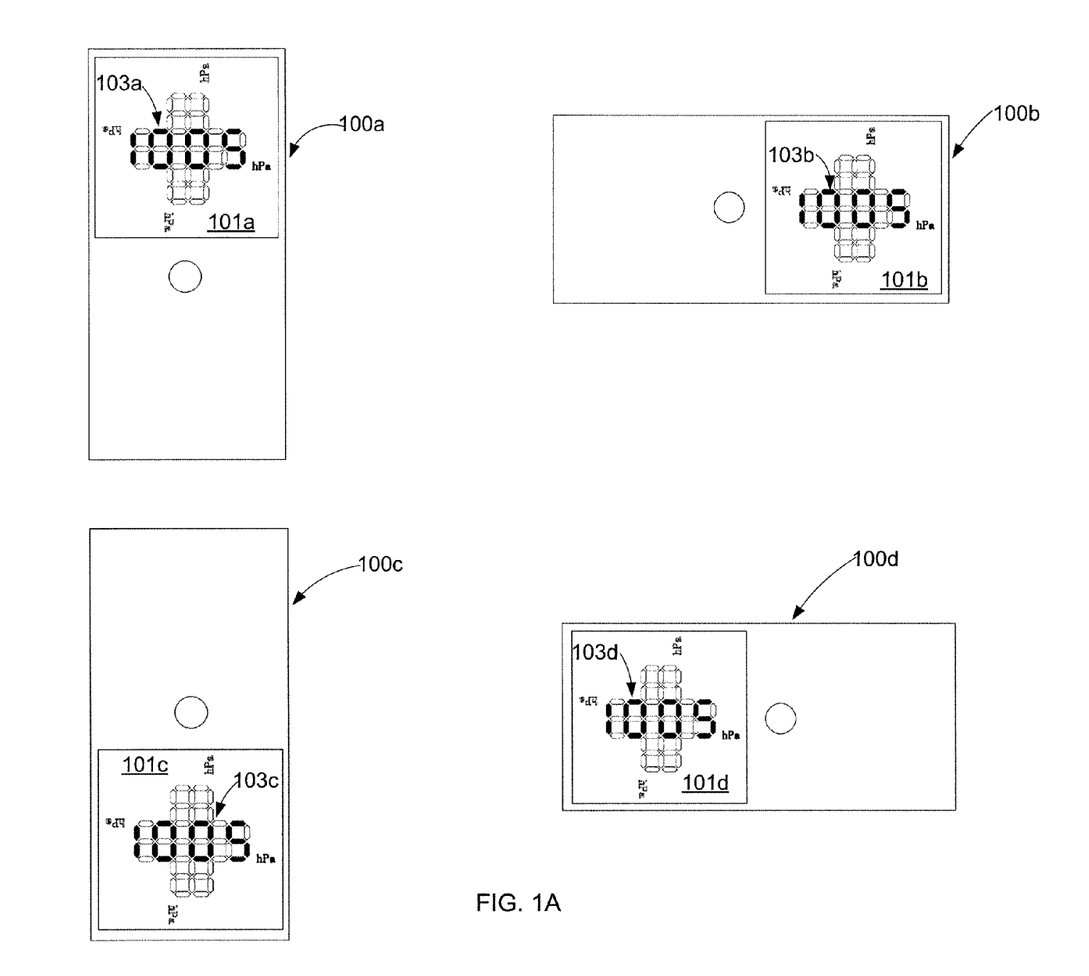
FIG. 1A shows different orientations of a display unit that are supported by an electrical device in accordance with an embodiment of the invention.

As shown in FIG. 1, display unit 101 includes a low cost LCD display. Display unit 101 may support:
Symmetric left and right for two orientations
Symmetric left, right, up and down all four orientations
Seven segment LCD/LED design that is arranged in a way that it can be view by all four orientations FIG. 1A shows different orientations of display unit 101 that are supported by an electrical device in accordance with an embodiment of the invention. With embodiments of the invention, electrical device 100 may be mounted in different orientations, including the up direction 100a, the left direction 100b, the down direction 100c, and the right direction 100d. Correspondingly, display unit 101 operates in the selected orientations 101a, 101b, 101c, and 101d, respectively. Alphanumeric characters are appropriately displayed based on the selected orientation, shown as 103a, 103b, 103c, and 103d, respectively.

While the exemplary embodiment shown in FIG. 1A shows a display unit having an output component, embodiments also support a display unit having an input component. For example, a processor (not shown) may instruct the display unit to display a keypad image on a touch screen. The user can then input commands to electrical device through the displayed keypad.

Embodiments of the invention support different types of electrical devices, including remote control devices, wall mounting lighting control devices, fan control devices, sensor devices, and networking devices.

Figure 2:
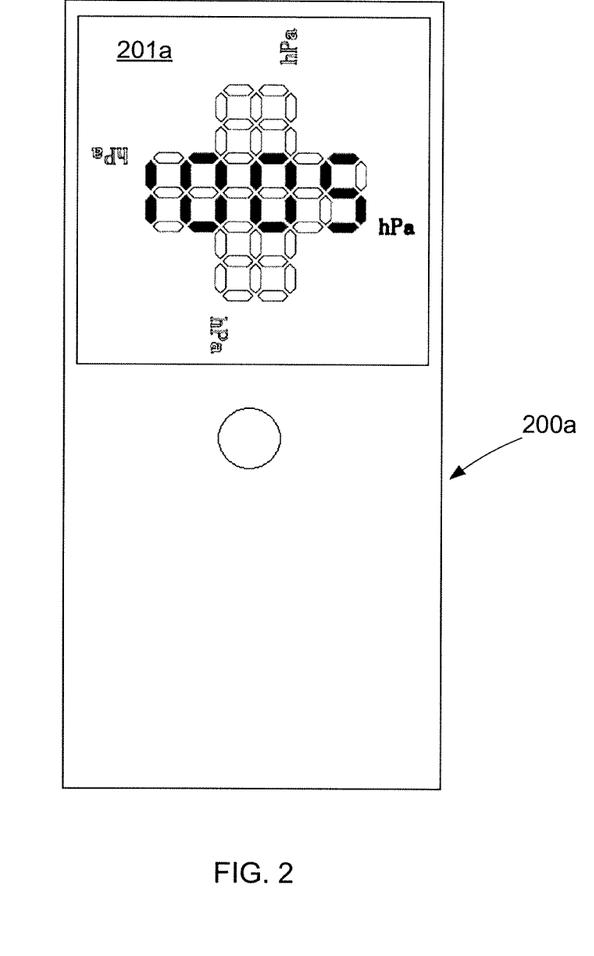
FIG. 2 shows an exemplary display in a selected orientation in accordance with an embodiment of the invention.

FIG. 2 shows exemplary display unit 201 of electrical device 200 in a selected orientation in accordance with an embodiment of the invention. In FIG. 2, electrical device 200 has an up orientation (corresponding to 200a), and display unit 201 operates in the selected orientation (corresponding to 201a).

Figure 3:
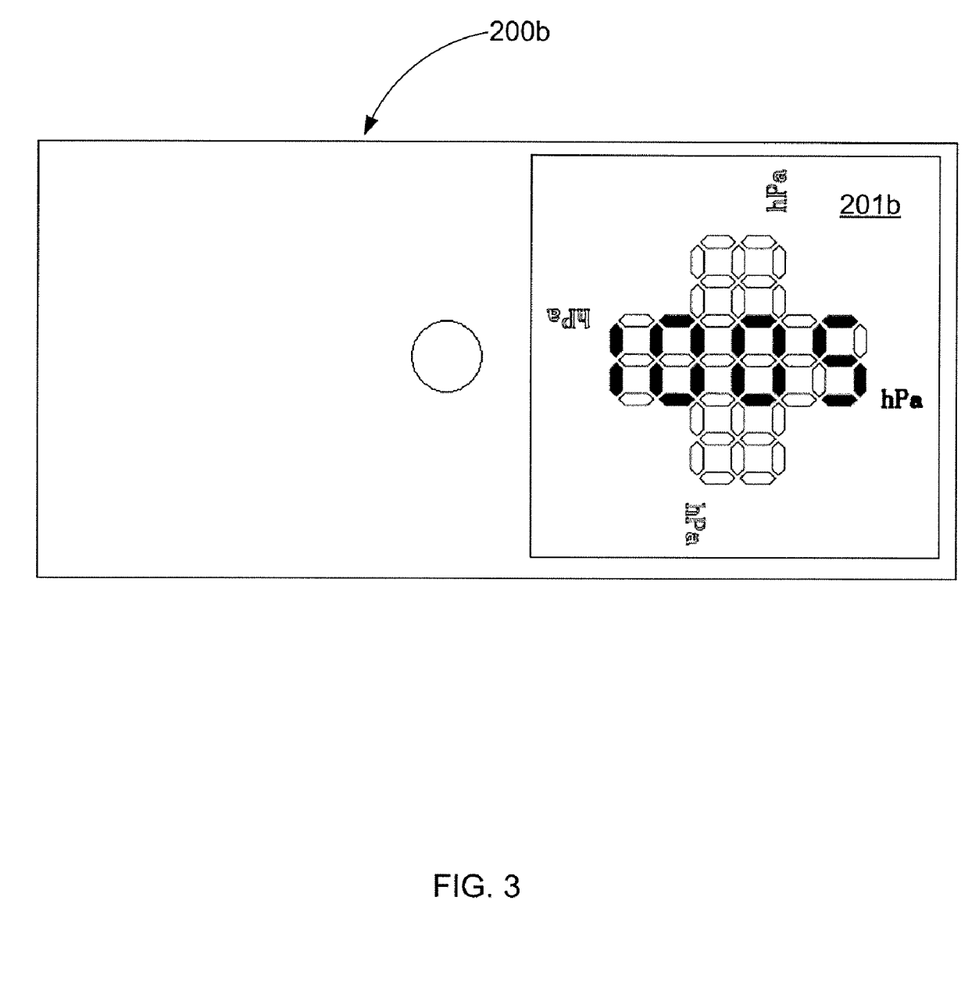
FIG. 3 shows an exemplary display in a selected orientation in accordance with an embodiment of the invention.

FIG. 3 shows an exemplary display unit 201 when electrical device 200 is turned 90 degrees in accordance with an embodiment of the invention. In FIG. 3, electrical device 200 has a right orientation (corresponding to 200b), where display unit 201 operates in the selected orientation (corresponding to 201b). As shown in FIG. 3, the displayed information is displayed on the right side of electrical device 200.

A processor (e.g., processor 403 in FIG. 4 as will be discussed) selects the desired portion of the display unit to show output information and to obtain input information.

Figure 4:
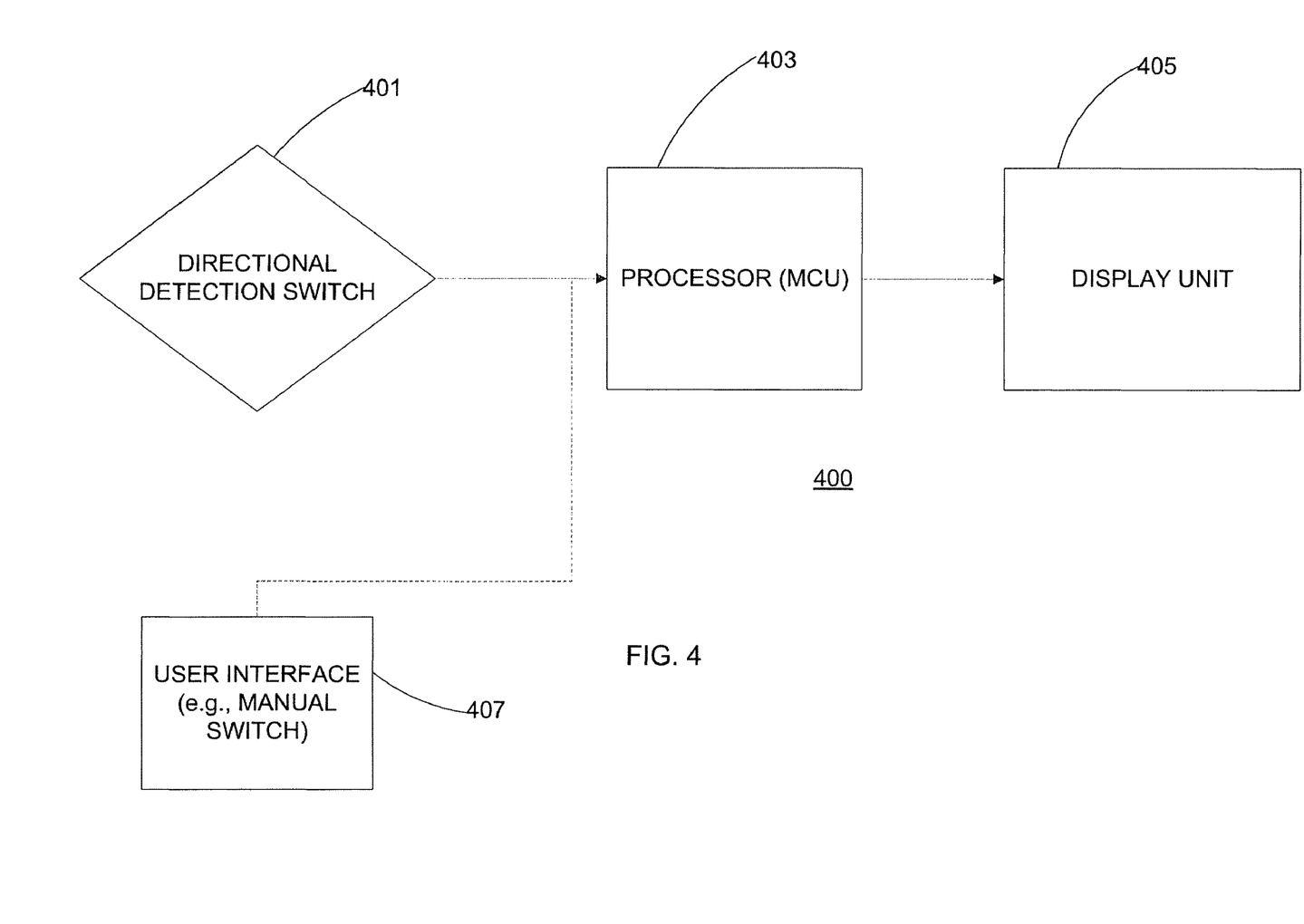
FIG. 4 shows an electrical device in accordance with an embodiment of the invention.

FIG. 4 shows electrical device 400 in accordance with an embodiment of the invention. Directional detection switch 401 senses the orientation of electrical device 400. For example, a user may mount electrical device 400 in an up direction or a left direction. Directional detection switch 401 provides direction information to processor 403, which may be implemented as a micro-controller unit (MCU). Electrical device 400 also displays display information on display unit 405.

With the embodiments shown in FIG. 1A, display unit 101 enables an electrical device to be operated in any one of four orientations. Embodiments of the invention may utilize a low cost liquid crystal display (LCD) module with a micro-controller unit that is typically used for a fixed orientation device. The price added for the invention is typically very minimal. Moreover, embodiments of the invention may utilize a high-end display device with a dot matrix type mono or color LCD, light emitting diode (LED), and vacuum fluorescent display (VFD) display technology.

As will be discussed, directional detection switch 401 may have a plurality of contacts that provide directional information. Processor 403 processes the directional information to determine the orientation of electrical device 400. Processor 403 consequently instructs display unit 405 to operate in the selected orientation. For example, FIG. 2 shows an exemplary display, in which electrical device 200a is mounted in orientation 101a. FIG. 3 shows an exemplary display when electrical device 200b is turned 90 degrees (orientation 101b).

Electrical device 400 may support two or more orientations. For example, electrical device may support left and right directions for two orientations or left, right, up and down for four orientations. Also, embodiments of the invention may support more than four orientations, e.g., if diagonal orientations are supported.

Embodiments of the invention may obtain directional information from user interface 407 rather than through directional detection switch 401. In such a case, the user may indicate the orientation of the electrical device. For example, the user may configure one or more manual switches to indicate the selected orientation. The user can change from one orientation to another orientation (e.g., "Orientation 1"->"Orientation 2"->"Orientation 3->"Orientation 4") or any combination of the permitted orientations.

If the orientation of electrical device 400 changes, e.g., from orientation 101 to orientation 103 as shown in FIG. 1, direction detection switch 401 provides modified direction information to processor 403. Processor 403 selects the new orientation based on the modified direction information and instructs display unit 405 to operate in the selected orientation.

Figure 5:
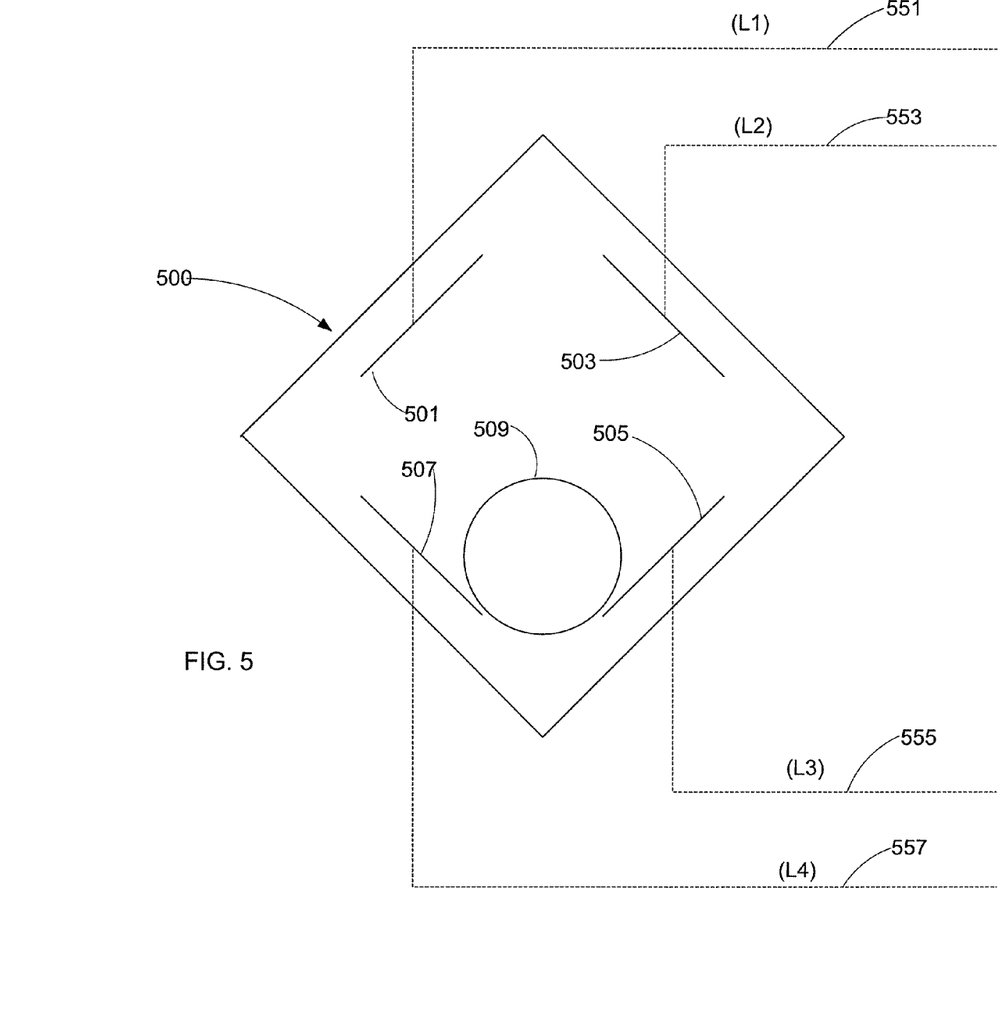
FIG. 5 shows a directional detection switch in accordance with an embodiment of the invention.

FIG. 5 shows directional detection switch 500 in accordance with an embodiment of the invention. Switch 500 contains four electrical contacts 501-507. Conductive ball 509 is positioned by gravity to conduct electrical current between a corresponding pair of adjacent contacts. Directional information is indicative of an identification of the contact pair. The directional information is provided to processor 403, and the processor selects the orientation of electrical device 400 based on the directional information. With embodiments of the invention, a conductive liquid (e.g., mercury at room temperature) is used rather than conductive ball 509.

When the orientation of electrical device 400 changes, the pair of activated adjacent contacts changes as conductive ball 509 is repositioned because of the effects of gravity. Table 1 maps the contact pair as a function of the orientation of electrical device 400.

TABLE 1

DIRECTIONAL DETECTION SWITCH

| ORIENTATION | ACTIVATED CONTACTS |
|---|---|
| UP | 505-507 |
| DOWN | 501-503 |
| RIGHT | 503-505 |
| LEFT | 501-507 |

As discussed above, a directional detection switch senses an orientation of an electrical device. However, an electrical device may incorporate other technologies to sense an orientation of the electrical device through a direction sensing module. For example, the direction sensing module may utilize a hall sensing device, a light sensing device, or an acceleration sensor (accelerometer).

Figure 6:
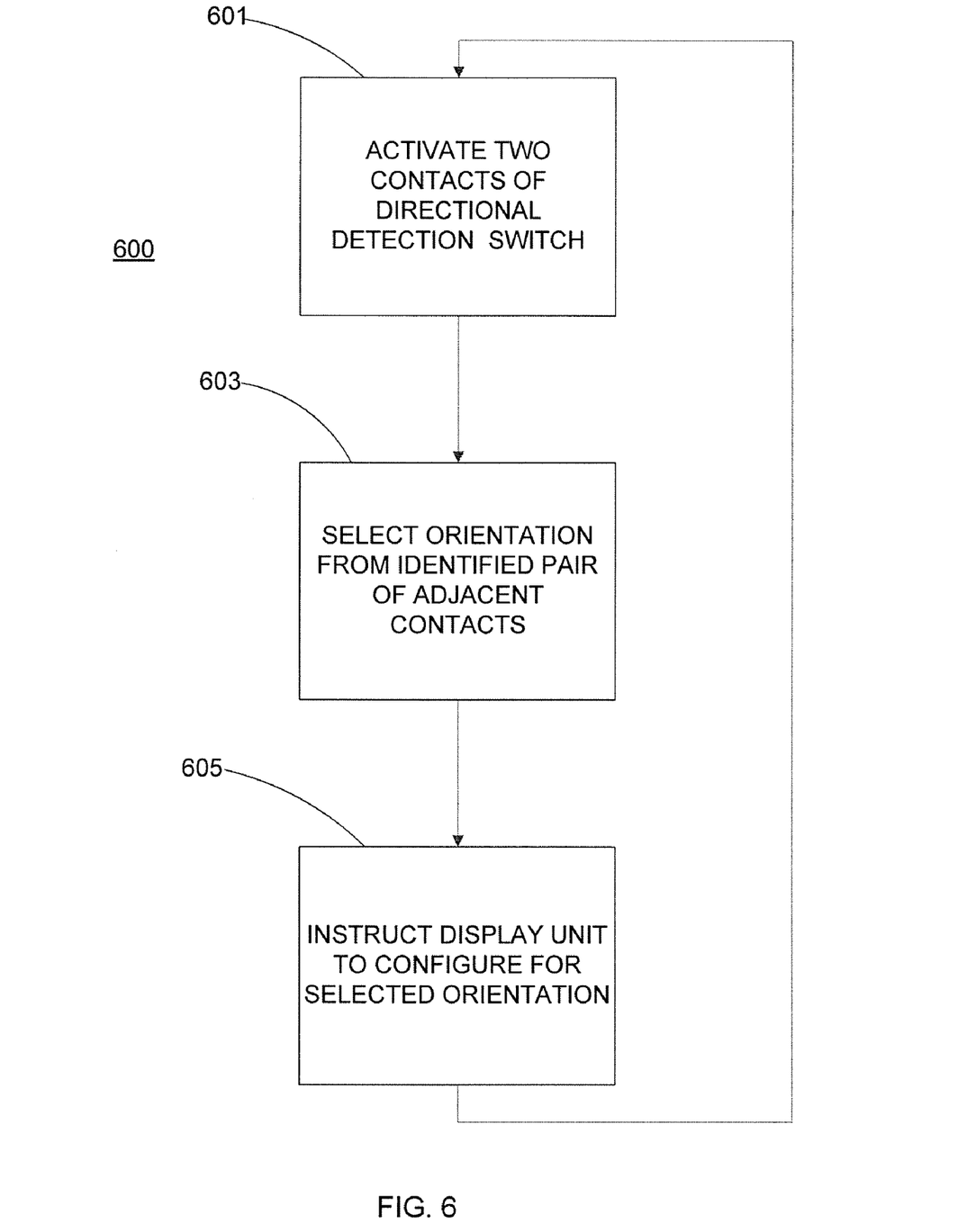
FIG. 6 shows a process for determining an orientation of an electrical device in accordance with an embodiment of the invention.

FIG. 6 shows process 600 for determining an orientation of an electrical device in accordance with an embodiment of the invention. In step 601, two adjacent contacts (pair of contacts) of directional detection switch 500 are activated in accordance with the orientation of electrical device 400. In step 603, processor 403 selects the orientation from the permitted orientation based on the identified pair of contacts. (An embodiment for selecting the orientation is discussed later with FIG. 7.) In step 605, processor 403 instructs display unit 405 to operate in the selected orientation (e.g., configured display unit 202a as shown in FIG. 2 or configured display unit 203b as shown in FIG. 3). Steps 601-605 may be repeated if the electrical device can change orientations (e.g., if the device can be located.)

Figure 7:
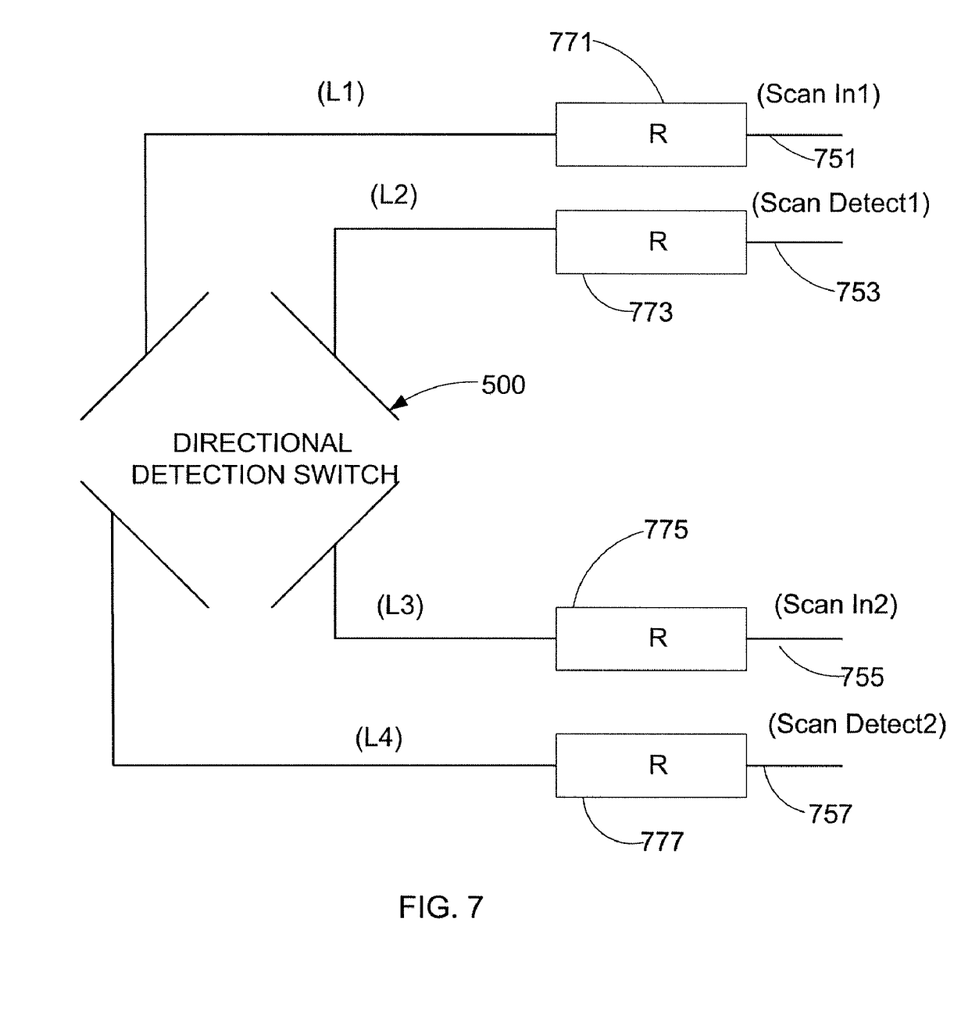
FIG. 7 shows an exemplary configuration of a directional detection switch for determining a selected orientation in accordance with an embodiment of the invention.

FIG. 7 shows an exemplary configuration of directional detection switch 500 for determining a selected orientation in accordance with an embodiment of the invention. With embodiments of the invention, processor 403 applies different signals (a high signal and a low signal) on leads 751 (Scan In1) and 755 (Scan In2) and detects the corresponding states on leads 753 (Scan Detect1) and 757 (Scan Detect2). For example, the high signal may be a pulse with a voltage level of 5 volts, and the low signal may have a voltage level of 0 volts, corresponding to '1' and '0', respectively, as shown in Table 2. Resistors 771-777 provides a desired of impedance to limit current flow through directional detection switch 500.

With embodiments of the invention, as shown in Table 2, processor 403 applies a high signal on Scan In 1 and a low signal on Scan In2 and then detects the initial states on Scan Detect1 and Scan Detect2. Once the initial state information is detected (and may be stored), processor 403 applies a low signal on Scan In1 and a high signal on Scan In2 and detects the subsequent states on Scan Detect1 and Scan Detect2.

TABLE 2

STATE INFORMATION FOR DIRECTIONAL DETECTION SWITCH

| Scan 1 | Scan 2 | Scan Detect 1 | Scan Detect 2 | Direction |
|---|---|---|---|---|
| 1 | 0 | 1 | 0 | Up |
| 0 | 1 | 0 | 0 | |
| 1 | 0 | 0 | 0 | Down |
| 0 | 1 | 0 | 1 | |
| 1 | 0 | 0 | 1 | Left |
| 0 | 1 | 0 | 0 | |

TABLE 2-continued

STATE INFORMATION FOR
DIRECTIONAL DETECTION SWITCH

| Scan 1 | Scan 2 | Scan Detect 1 | Scan Detect 2 | Direction |
|---|---|---|---|---|
| 1 | 0 | 0 | 0 | Right |
| 0 | 1 | 1 | 0 | |
| 1 | 0 | 1 | 1 | Error |
| 0 | 1 | 1 | 1 | Error |

Using Table 2, processor 403 matches the initial state information and the subsequent state information in order to determine the orientation of electrical device 400. For example, if the initial states of Scan Detect1 and Scan Detect2 are '0' and '1' and the subsequent states are '0' and '0', then processor 403 determines that the selected orientation is the left direction. As shown in Table 2, an error is detected if certain state information is detected. An error may occur for different reasons, including a failure of directional detection switch 500.

Figure 8:
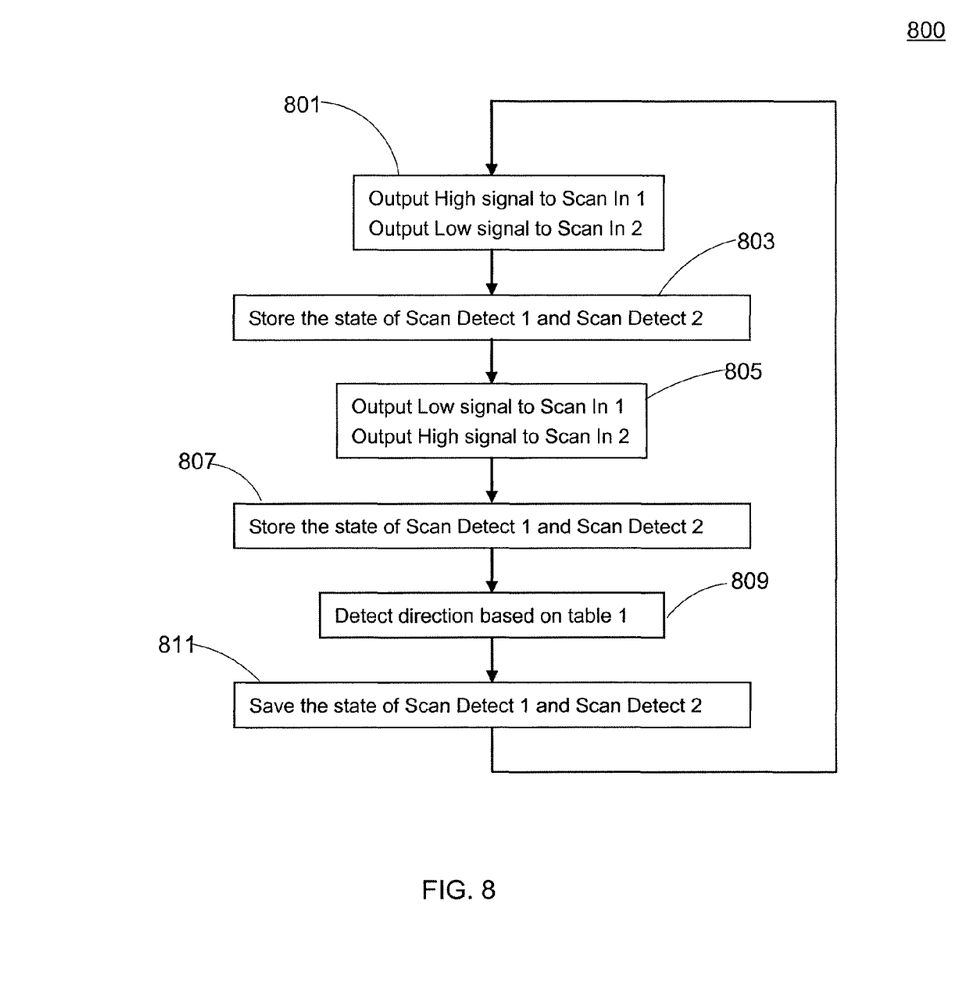
FIG. 8 shows a process for determining an orientation of an electrical device based on state information from a directional detection switch.

FIG. 8 shows process 800 for determining an orientation of an electrical device based on state information from directional detection switch 500 as shown in FIG. 7. In step 801, processor 403 applies a high signal to Scan In1 and a low signal to Scan In2. Processor 403 reads and stores the initial state information from Scan Detect1 and Scan Detect2 in step 803. In step 805, processor 403 applies a low signal to Scan In1 and a high signal to Scan In2. Processor 403 then reads and stores subsequent state information from Scan Detect1 and Scan Detect2 in 809. In step 811, processor stores the subsequent state information. Processor 403 then processes the state information to determine the orientation. Processor 800 may be repeated (e.g., periodically) to determine if the orientation of the electrical device changes.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electrical device, comprising:
 a direction sensing switch providing direction information that is indicative of a device orientation of the electrical device, the device orientation being one of a plurality of permitted orientations, the directional sensing switch including two pairs of scan and detect leads;
 a display unit configurable for a selected orientation; and
 a processor configured to:
  apply initial signals to at least one scan lead of the two pairs of scan and detect leads;
  detect an initial state for a scan detect lead of the two pairs of scan and detect leads;
  apply subsequent signals to the at least one scan lead;
  detect a subsequent state for the scan detect lead;
  determine a determined orientation from the initial state and the subsequent state; and
  instruct the display unit to operate in the determined orientation.

2. The electrical device of claim 1, the direction sensing switch comprising a hall sensing device.

3. The electrical device of claim 1, the direction sensing switch comprising a light sensing device.

4. The electrical device of claim 1, the direction sensing switch comprising an acceleration sensor.

5. The electrical device of claim 1, the direction sensing switch comprising a directional detection switch.

6. The electrical device of claim 5, the directional detection switch comprising a plurality of electrical contacts, the directional information being indicative of activated contacts.

7. The electrical device of claim 6, the directional detection switch activating two adjacent contacts from the plurality of electrical contacts.

8. The electrical device of claim 7, the directional detection switch further comprising a conductive component conducting an electrical current through the two adjacent contacts based on the device orientation.

9. The electrical device of claim 8, the conductive component comprising a conductive ball.

10. The electrical device of claim 9, the conductive ball being positioned by gravity.

11. The electrical device of claim 8, the conductive component comprising a conductive liquid.

12. The electrical device of claim 5, the directional detection switch being able to discern an up direction, a down direction, a right direction, and a left direction.

13. The electrical device of claim 5, the display unit having an output component and configuring an operation for the determined orientation.

14. The electrical device of claim 5, the display unit having an input component and configuring an operation for the determined orientation.

15. The electrical device of claim 5, the display unit comprising a liquid crystal display (LCD) module and the processor configuring the LCD module in accordance with the determined orientation.

16. The electrical device of claim 14, the input component comprising a touch screen for obtaining a user input, the touch screen being configured in accordance with the determined orientation.

17. The electrical device of claim 1, wherein the processor is further configured to:
 obtain directional information from a user input device, the directional information indicative of a user configuring at least one manual switch; and
 instruct the display unit to operate in the selected orientation from the determined orientation and the directional information.

18. A method for configuring an electrical device having two pairs of scan and detect leads, comprising:
 applying, by a processor, initial signals to at least one scan lead of the two pairs of scan and detect leads;
 detecting, by the processor, an initial state for a scan detect lead of the two pairs of scan and detect leads;
 applying, by the processor, subsequent signals to the at least one scan lead;
 detecting, by the processor, a subsequent state for the scan detect lead;
 obtaining, by the processor, direction information from the initial state and the subsequent state;
 selecting, by the processor, a selected orientation from a plurality of permitted orientations based on the direction information; and configuring, by the processor, a display unit of the electrical device to operate in the selected orientation.

19. The method of claim 18, further comprising:
activating two adjacent contacts from a plurality of electrical contacts, the direction information being indicative of an identification of the two adjacent contacts.

20. The method of claim 18, further comprising:
obtaining the direction information from a user input device.

21. The method of claim 19, further comprising:
positioning a conductive component, the conductive component conducting an electrical current through the two adjacent contacts based on the device orientation.

22. The method of claim 18, further comprising:
discerning an up direction, a down direction, a right direction, and a left direction; and
(e) generating the direction information to include the discerned direction.

23. The method of claim 18, further comprising:
configuring an output component of the display unit based on the selected orientation.

24. The method of claim 18, further comprising:
configuring an input component of the display unit based on the selected orientation.

25. The method of claim 18, further comprising:
changing the selected orientation based on modified direction information.

26. A method for configuring an electrical device, comprising:
(a) providing direction information that is indicative of a device orientation of the electrical device;
(b) selecting a selected orientation from a plurality of permitted orientations the selecting including:
(b)(i) applying, by a processor, a high signal on a first scan lead and a low signal on a second scan lead;
(b)(ii) detecting, by the processor, a first initial state on a first scan detect lead and a second initial state on a second scan detect lead;
(b)(iii) applying, by the processor, the low signal on the first scan lead and the high signal on the second scan lead;
(b)(iv) detecting, by the processor, a first subsequent state on the first scan detect lead and a second subsequent state on the second scan detect lead; and
(b)(v) including, by the processor, state information in the direction information, the state information being indicative of the first initial state, the second initial state, the first subsequent state, and the second subsequent state; and
(c) configuring, by the processor, a display unit of the electrical device to operate in the selected orientation based on the first initial state, the second initial state, the first subsequent state, and the second subsequent state.

* * * * *